United States Patent [19]

Everton

[11] Patent Number: 5,670,838
[45] Date of Patent: Sep. 23, 1997

[54] ELECTRICAL MACHINES

[75] Inventor: John M. Everton, Redditch, United Kingdom

[73] Assignee: Unique Mobility, Inc., Golden, Colo.

[21] Appl. No.: 157,133

[22] Filed: Dec. 6, 1993

Related U.S. Application Data

[63] Continuation-in-part of PCT/GB92/01002, Jun. 3, 1992, published as WO92/22121, Dec. 10, 1992.

[30] Foreign Application Priority Data

Jun. 5, 1991 [GB] United Kingdom ............... 9112059

[51] Int. Cl.⁶ ............... H02K 1/12; H02K 9/00; H02K 9/08; H02K 1/32
[52] U.S. Cl. ............... 310/254; 310/54; 310/58; 310/57; 310/65
[58] Field of Search ............... 310/52, 54, 59, 310/58, 56, 57, 254, 60, 60 R, 64, 61, 65

[56] References Cited

U.S. PATENT DOCUMENTS

| | | | |
|---|---|---|---|
| 3,530,320 | 9/1970 | Davidson | 310/59 |
| 3,609,420 | 9/1971 | Inagaki | 310/54 |
| 3,648,085 | 3/1972 | Fujii | 310/54 |
| 3,745,389 | 7/1973 | Lorch | 310/52 |
| 3,805,547 | 4/1974 | Eber | 310/54 |
| 4,323,803 | 4/1982 | Danko | |
| 4,517,479 | 5/1985 | Aleem et al. | 310/54 |
| 4,709,180 | 11/1987 | Denk | |
| 4,797,588 | 1/1989 | Capion | 310/54 |
| 4,852,245 | 8/1989 | Denk | |
| 4,908,347 | 3/1990 | Denk | |
| 4,968,911 | 11/1990 | Denk | |
| 5,004,944 | 4/1991 | Fisher | |
| 5,030,877 | 7/1991 | Denk | |
| 5,347,188 | 9/1994 | Iseman et al. | 310/68 D |

FOREIGN PATENT DOCUMENTS

| | | |
|---|---|---|
| 541667 | 7/1922 | France |
| 1016478 | 11/1952 | France |
| 335201 | 10/1919 | Germany |
| 896086 | 10/1953 | Germany |

*Primary Examiner*—Steven L. Stephan
*Assistant Examiner*—Michael Wallace, Jr.
*Attorney, Agent, or Firm*—William A. Knoeller

[57] ABSTRACT

An electromechanical transducer, such as a motor (1), comprising a rotor member (4), a stator member (3) having an electrical winding (8), and isolating means (11, 9, 16, 12) isolating at least a part (18) of one of the members (3) from the other member (4), and cooling fluid in direct contact with said part (18) and isolated from the other member (4). The stator member (3) is preferably cooled by pumping liquid past it, whilst the rotor member (4) is isolated from the liquid. The rotor member (4) preferably operates in an evacuated chamber (48). A pump (5) is preferably provided to pump the cooling liquid around a cooling circuit (47, 6, 5, 47, 42).

20 Claims, 10 Drawing Sheets

ELECTRICAL MACHINES

This is a continuation-in-part of International Application PCT/GB92/01002 with an International Filing date of Jun. 3, 1992, now abandoned.

This invention relates to improvements in or relating to electrical machines, especially, but not exclusively, brushless D.C. motors.

There have been very many proposals intended to improve the operation of transducers for electrical power/mechanical power conversion (motors or generators). However, there are still areas where the use of electric motors is impossible or impractical, for example for use as the main drive of a vehicle such as a car. Current electric motors are still too large, heavy, and produce too little power (especially at high speed) for commercial use in a vehicle such as a car.

An aim of the present invention is to provide a new electrical machine.

One problem associated with electrical machines, such as electric motors, is that it can be necessary to cool them because they generate heat which reduces their efficiency. At present such machines may be cooled by blowing air through or over them. For heavy duty applications it is known to spray oil onto the rotor and stator assemblies and into the gap between them using a high pressure pump. A scavenger pump may also be provided to collect the sprayed oil for re-cycling.

According to a first aspect of the invention I provide an electromechanical transducer comprising a rotor member, a stator member having an electrical winding, and isolating means isolating at least a part of one of the members from the other member; and cooling fluid in direct contact with said part and isolated from the other member.

Direct contact between the cooling fluid and said part cools said part effectively.

Preferably the rotor member has magnet means, or at least magnetizable regions (the invention is not restricted to permanent magnet machines).

The cooling fluid is preferably isolated from the rotor member. This eliminates any frictional drag on the rotor member associated with cooling liquids such as are experienced in spray cooling, or other forms of fluid cooling.

The one member preferably includes an electrical winding and said part preferably comprises a portion of the winding. Said part most preferably comprises an end turn of the winding.

The one member may comprise one or more windings having a central portion and an end portion or portions held in a thermally substantially uninsulated manner, said one part comprising said end portion or portions and being in direct contact with the cooling fluid. The central portion may be moulded together, for example by resin. The central portion may be held in an electrically and/or thermally insulating manner.

Preferably the cooling fluid is a liquid, and may be oil, or may be a liquid with a higher specific heat.

The fluid may be forced around a cooling circuit so as to force cool said part. Heat exchanger means may be provided in the cooling circuit.

A plurality of windings may be provided interleaved with a plurality of magnetic field concentrating means (hereinafter referred to as teeth). The end turns, or end portions, of the windings preferably project beyond the extent of the teeth.

The transducer may have a central axis and a pair of axially spaced end chambers into which end turns of the windings project. Passage means may communicate one end chamber with the other so as to allow cooling fluid to flow between them. The passage means may be formed in an outer housing of the transducer, or in a back, or return path, member disposed adjacent to the windings.

The passage means may follow the elongate length of the winding, or at least a portion of the winding. The passage means may have part of its cross-section defined by the winding. The passage means may be wound on the stator member. These possibilities are considered to be especially desirable when the winding comprises a superconductor wire or strip. The passage means may surround the winding wire or strip, for example concentrically or co-axially.

Said part may be isolated from the other member by a dividing wall, which may comprise a ring. Sealing means may be provided at the dividing wall. The dividing wall may extend from the back member to the outer housing. The dividing wall preferably extends for substantially the full axial length of the rotor member and/or stator member, or at least of the windings.

The other member is preferably housed in a sealed chamber, which chamber may be at least partially evacuated. When the other member is a rotor this reduces frictional resistance to movement. Preferably the low pressure chamber forms a hermetically sealed unit, and may be substantially fully evacuated. Alternatively or additionally the chamber may be filled with an inert gas, such as nitrogen, in order to prevent corrosion of the magnets.

The transducer is preferably a brushless D.C. motor, but the invention is also applicable to other machines such as permanent magnet synchronous, synchronous reluctance, and asynchronous induction machines, (to name but three).

Another problem associated with electromechanical transducers, such as motors and generators, is that of losses, for example, due to eddy currents.

According to a second aspect of the invention I provide an armature for an electromechanical transducer comprising a plurality of angularly spaced teeth defining armature slots for armature windings, and a back, or return path, member adapted to provide a return path for magnetic flux between groups of teeth coupling appropriate magnetic poles; the teeth and back member comprising separate elements secured together.

There may be a gap in the magnetic path between the teeth and the back member. This may be achieved by interposing a non-magnetic layer or film between the teeth and back member, the layer acting as a magnetic reluctance. This increases the reluctance path from a tooth to the back member, reducing the self-inductance of the windings.

The teeth preferably have anisotropic magnetic characteristics and have a low loss direction in which there is little loss of magnetomotive force (mmf) in the teeth. The teeth are preferably made from laminated material.

The region of the back member adjacent a tooth is preferably of isotropic material, especially in the radial region where the flux changes from extending radially to extending circumferentially. The region of the back member adjacent to a tooth may have no low loss direction, or it may have a low loss direction which extends in a different (preferably perpendicular) direction to that of the tooth. This second option accepts the drawbacks of orientated material where the flux changes direction in exchange for the benefits of having orientated material where the flux extends substantially circumferentially. Alternatively the portion of the back member adjacent the teeth could have a radial low loss direction, although this is not our preferred arrangement.

The back member may comprise amorphous magnetic material, such as amorphous steel, having isotropic magnetic properties. Alternatively, the back member may comprise a plurality of regions of material each of which has a low loss direction, but adjacent regions having their low loss directions extending in different directions. The back member may comprise layers of anisotropic magnetic material, such as unidirectional steel, adjacent portions of a layer having low loss directions which extend in different directions. The layers may be formed from a continuous strip of material, which may be wound in a helix.

The back member may comprise a first radial region of substantially isotropic material and a second radial region of anisotropic material. Such a back member may comprise another aspect of the invention.

Preferably the first region is closest to, or is at the region of, the fluctuating magnetic field (nearer the magnets). The first region may be radially inward of the second region.

A tooth preferably comprises laminations extending generally parallel to each other, at least in a central region of the tooth. The laminations at the central region preferably extend in generally radial planes.

The laminations may diverge circumferentially at the radially inner and/or outer ends of the tooth.

The teeth may have self-centering formations provided at at least one, or either, circumferential side. The self-centering formation may be formed from a continuation of a lamination of the tooth, preferably the outer lamination of a tooth.

According to a third aspect the invention comprises a method of making a laminated tooth for an armature comprising folding a continuous strip of sheet material back on itself to form two adjacent laminations joined by a bend or corner region, and then removing the material of the corner region.

This facilitates automisation of the manufacture of teeth.

The corner region may be ground off, preferably after the laminations have been fixed together, for example by gluing.

According to a fourth aspect of the invention a tubular back, or return path, member of an armature is made by taking a continuous strip of magnetic material having a low loss direction, and bending that strip around in an annular, helical, manner so as to form a laminated tube.

The strip is preferably slotted or notched prior to bending.

Preferably two adjacent layers of strip in the laminated tube do not have superimposed notches or slots.

According to a fifth aspect the invention consists in an electromechanical transducer having an armature in accordance with the second aspect of the invention or a tooth or back member made in accordance with the third or fourth aspects of the invention.

A further aspect of the invention also was inspired by a desire to reduce losses from an electromechanical transducer.

According to a sixth aspect of the invention I provide a rotor member of an electromechanical transducer having a plurality of angularly spaced magnets and interpolar elements interposed between adjacent magnets, the interpolar elements having anisotropic magnetic properties such that they have a low magnetic reluctance direction extending in a generally radial direction and relatively high magnetic reluctance in a circumferential direction.

Thus there is not just air between adjacent magnets. This enables us to minimise eddy currents in the interpolar regions of the member, provide greater control of the flux between two poles of magnets, and may also enable us to control or limit the cross slot flux at the tips of an armature's teeth.

Preferably the interpolar elements extend from one magnet substantially to the adjacent magnet so as to provide recessed or sunken magnets.

The interpolar elements may comprise laminated bodies, preferably of unidirectional steel. The laminations are preferably in substantially radial planes.

The laminations of the interpolar elements may diverge circumferentially at their radially outer regions. They may form a uniformly divergent fan.

Circumferential air gaps may be provided between an interpolar element and a magnet adjacent it.

The magnets are preferably permanent magnets and the transducer is preferably a P.M. D.C. brushless machine.

Brushless D.C. motors in accordance with at least some of the aspects of the invention will now be described by way of example only with reference to the accompanying drawings of which.

FIGS. 1 to 4 show a brushless D.C. motor 1 of about 60 horse power comprising an outer housing or casing 2, a stator assembly 3, and a rotor assembly 4. A pump 5 and a heat exchanger 6 are provided as described later. An electronic controller 7 controls the supply of electricity to the motor.

Figure 1:
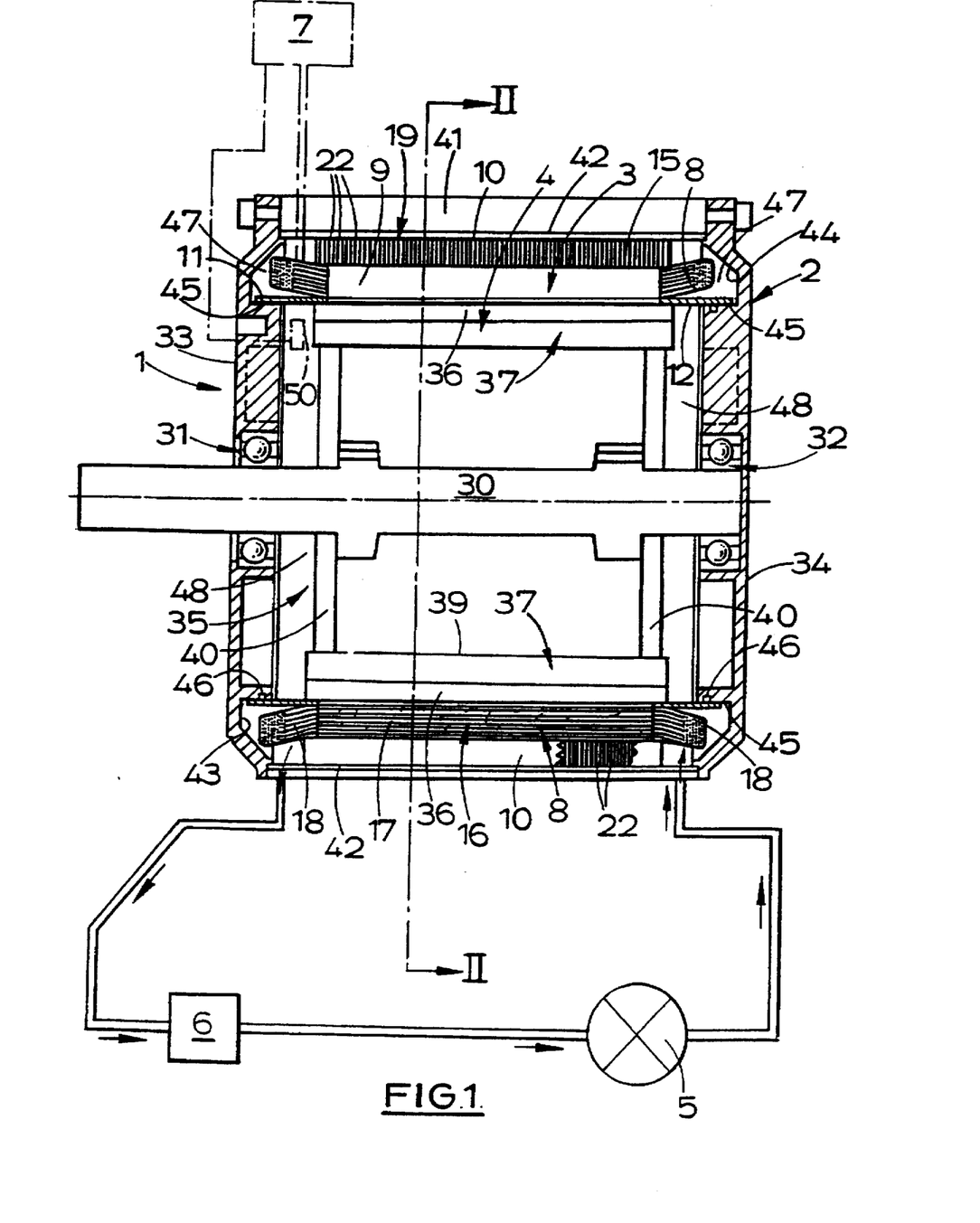
FIG. 1 shows a cross-section of a brushless D.C. motor in accordance with the first, second, third and fourth aspects of the invention.
Figures 2A, 2B:
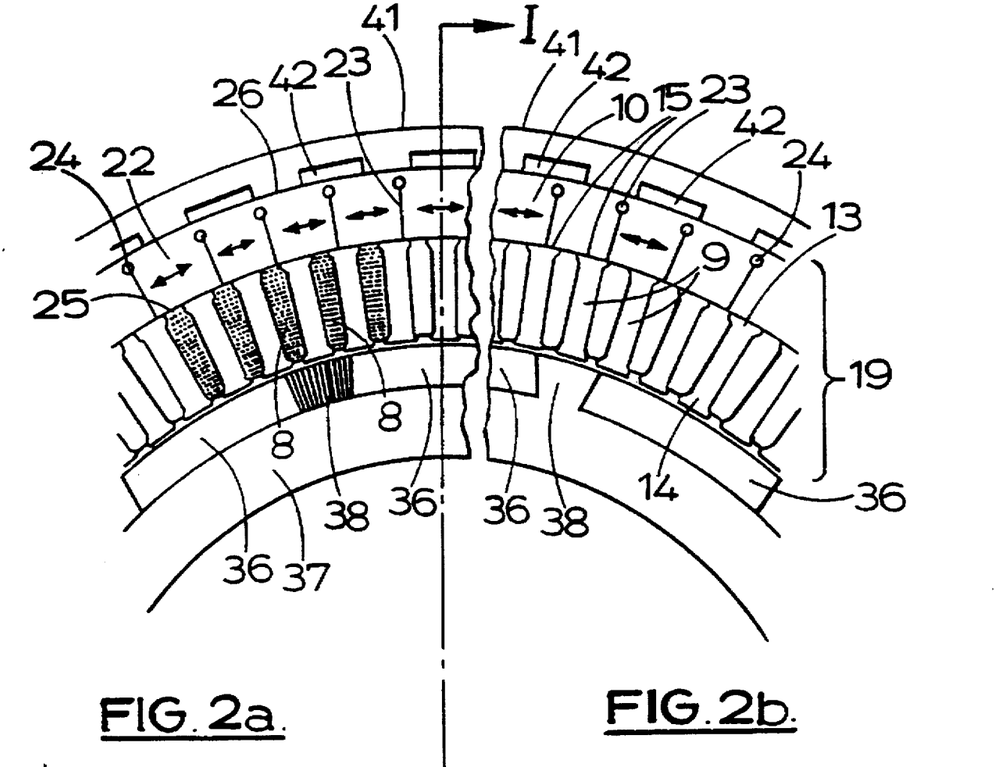
FIG. 2a shows a cross-section on line II—II of FIG. 1.
FIG. 2b shows a similar view to that of FIG. 2a, but of a modified motor.

The stator assembly 3 comprises an armature having windings 8 of copper wire, a series of angularly spaced and axially elongate teeth 9 interposed between adjacent windings 8, a back, or return path, member 10 forming a hollow cylinder around windings and teeth, and a pair of axially spaced sealing rings 11 and 12. The teeth 9 have in radial cross-section a flared or divergent head portion 13 adjacent the back member 10 and a similarly divergent foot portion 14 adjacent the rotor assembly 4 (see FIG. 2). The head portions 13 of the teeth are very slightly spaced from the back member 10 so as to create a magnetic back gap 15 between them. This back gap 15 increases the reluctance path for magnetic flux passing from the teeth to the back member which has the effect of reducing the self-inductance of the armature windings 3. The back gap is filled with resin to bond the teeth 9 to the back member 10 and the resin serves as a magnetic reluctance.

The windings 8 have central portions 16 embedded in resin 17 and end portions 18 extending beyond the resin 17. The end portions 18 comprise the end turns of the windings, which end turns are not covered by the thermally insulating resin 17 such as araldite epoxt resin or an inorganic resin. The resin 17 also embeds the teeth 9 and forms the teeth and windings into a unitary stator structure 19. The sealing collars 11 and 12 can be independent elements or combined into a single structure (for example they may be ends of continuous cylinder, which may be of plastics material) and are made of non-magnetic, non conducting material, and are attached at one of their cylindrical ends to the unitary stator structure 19. The other end of the sealing collars 11 and 12 are adapted for sealing engagement with the housing 2, as will be described later. The sealing collars, or rings 11 and 12 may be made of glass filled plastics material, or non-magnetic stainless steel.

Figure 3:
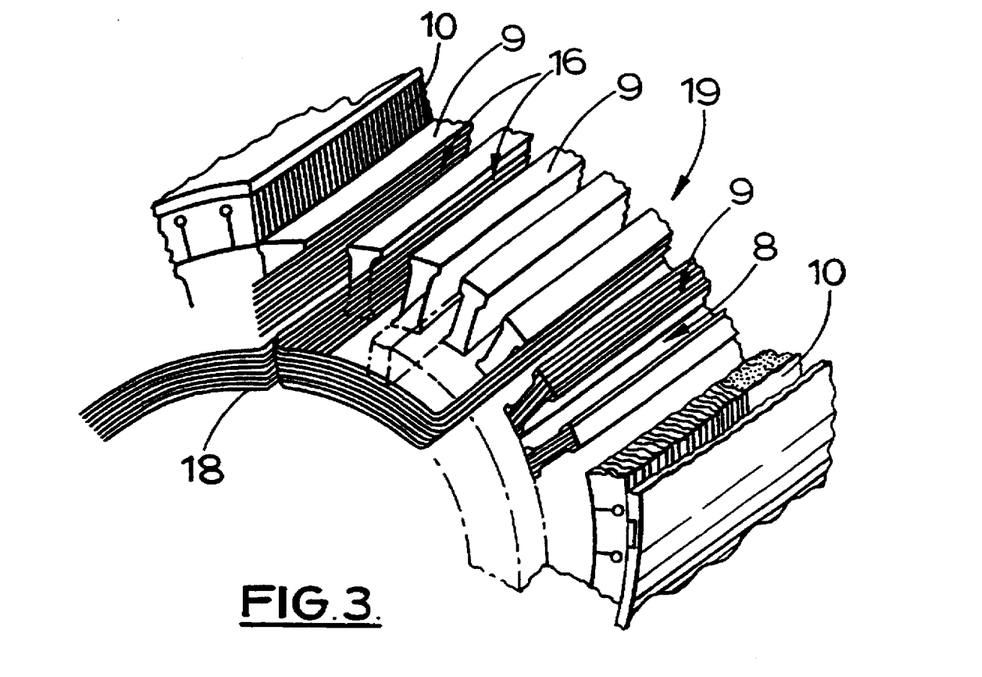
FIG. 3 shows features of detail of the stator assembly of the motor of FIG. 1.
Figure 6:
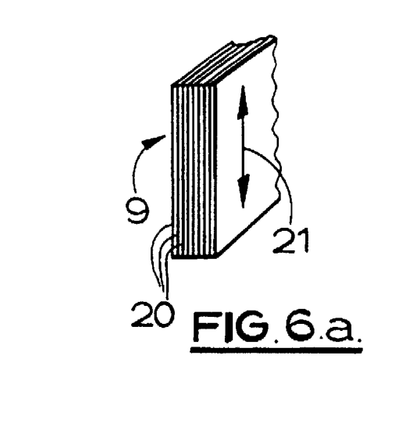
FIGS. 6a to 6d show schematically sections through four alternative forms of teeth for the stator armature of the motor of FIG. 1.

Each tooth 9 is made from laminations 20 of unidirectional steel (steel having a single low loss direction). The laminations 20 are best seen in FIGS. 3 and 6 and extend axially and radially and lie in a substantially radial plane of the armature. The low loss direction of each lamination is represented by arrow 21 of FIG. 6a and extends in a radial direction.

The back member 10 is made from a continuous strip 22 of unidirectional steel (shown in FIG. 7) wound in a helix so that adjacent turns of the helical form adjacent laminar layers. The strip 22 is punched out of a band of unidirectional steel and has wedge-shaped slots 23 centred on holes 24, and arcuate inner and outer edges 25 and 26 to enable it to be wound to form the back member 10. The low loss direction of the strip 22 is represented by arrows 27.

Figure 7:
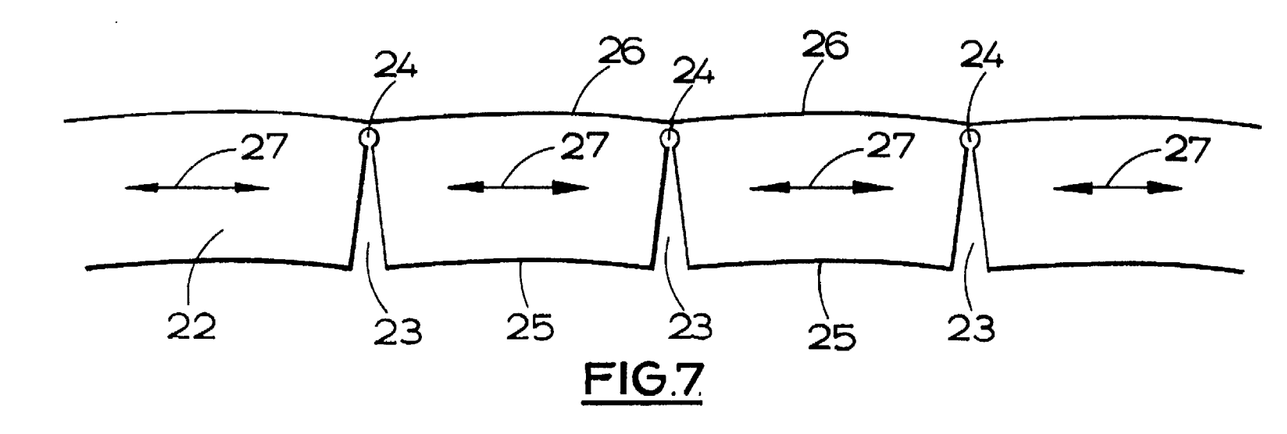
FIG. 7 shows schematically a portion of a unidirectional steel strip used to make the flux return member of the stator assembly of FIG. 3.

When the strip 22 is wound to form the back member 10 it comprises many segments each having a low loss direction pointing generally tangentially to the pitch-circle of the back member 10, adjacent segments having low loss directions pointing in slightly different directions. This gives the overall back member 10 a generally circumferential low loss direction. The holes 24 and slots 23 of any two adjacent layers of the wound strip 22 are not superimposed. In less preferred versions superimposition may be allowed.

Figure 4:
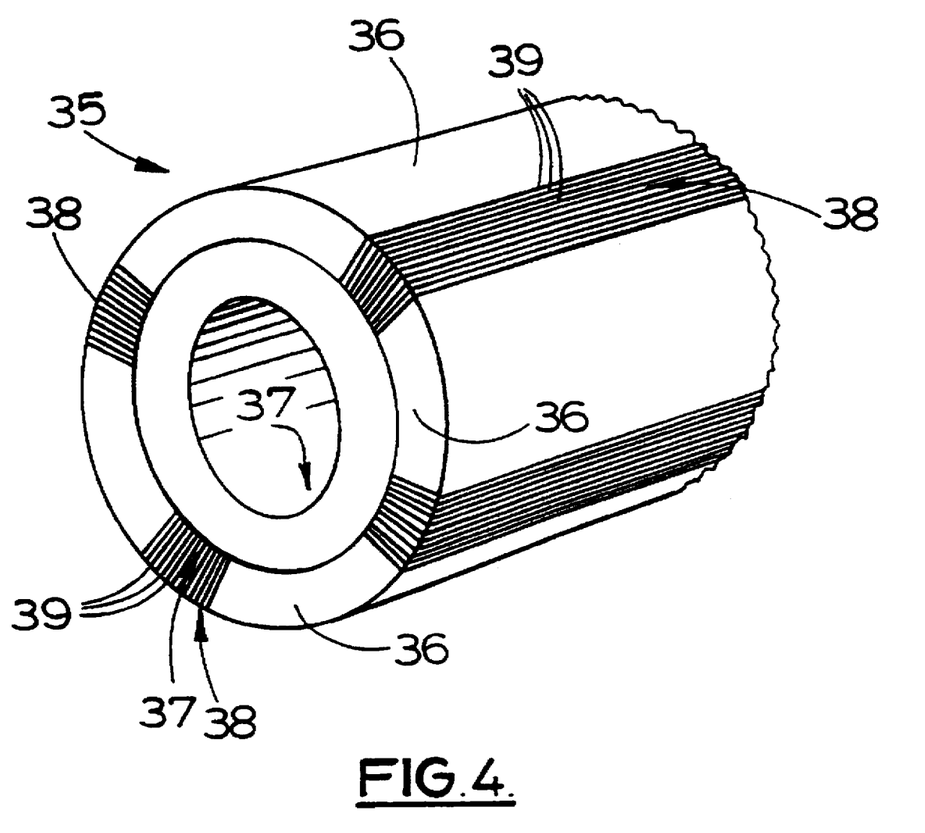
FIG. 4 shows features of detail of the rotor of the motor of FIG. 1.

The rotor assembly 4 comprises a main shaft 30 journalled for rotation by bearings 31 and 32 mounted in end walls 33 and 34 of the housing 2, and a rotor body 35. The rotor body 35 comprises twelve permanent magnets 36 (for example neodymium-iron-boron magnets) equiangularly spaced and recessed in a solid or laminated carrying body 37. FIG. 4 only shows four magnets 36 for simplicity. Interpolar regions, or interpoles 38, extend between the magnets 36. The interpoles 38 comprise axially extending radial laminations 39 (see FIG. 4) and serve to reduce pole face losses in the motor. The carrying body 37 is connected to the main shaft by end plates 40 of the rotor body 35.

The interpoles 38 have a relatively high magnetic reluctance circumferentially. This is achieved by arranging for the low reluctance direction of the laminations 39 to be generally radial.

The housing 2 comprises the two end plates 33 and 34 which are bolted to an axially extending cylindrical wall 41. Axially extending communication channels 42 are formed in the inner surface of the wall 41 and extend for its full axial length. The end walls 33 and 34 have annular chamber spaces 43 and 44 formed into their inner surfaces, and an adjacent annular sealing face 45. The face 45 also defines a groove for an annular seal 46.

The sealing collars 11 and 12 of the unitary stator structure 19 bear against the sealing faces 45 of the end walls 33 and 34, trapping the annular seals 46 so as to form a seal isolating axially spaced annular end turn chambers 47 from an inner, central, chamber 48. The end turn chambers 47 are defined in part by the chamber spaces 43 and 44, in part by the sealing collars 11 and 12, in part by the end turn portions 18 of the windings, and in part by the back member 10. The two end turn chambers 47 communicate with each other via the channels 42. (In an alternative structure the two sealing collars 11 and 12 are opposite ends of a continuous cylinder of plastics isolating member which forms a seal with each end plate 33 and keeps the cooling liquid from the rotor assembly. The cylinder is disposed between the windings 8 and the chamber 48).

The end turn chambers 47 hold cooling liquid which is in direct contact with the end turns of the windings (which are not embedded in the resin). The pump 5 circulates the cooling liquid, which may be oil, through the heat exchanger 6 to dissipate heat generated by the operation of the motor.

Although only the end turns of the windings are directly cooled I have found that this is quite sufficient and allows us to have a unitary stator using conventional resin embedding techniques.

The provision of a separate heat exchanger 6 may not always be necessary: circulating the cooling liquid within the housing may cool the motor sufficiently.

The central chamber 48 may be evacuated and hermetically sealed during the manufacture of the motor. This reduces frictional resistance to the rotation of the rotor assembly. Although I prefer to provide a hermetically sealed chamber 48, in an alternative motor means could be provided to evacuate the chamber 48 either continuously or periodically. I also envisage that in certain circumstances it might be preferred to fill the chamber 48 with a chemically inert gas, such as nitrogen. This would reduce corrosion of the magnets.

The supply of a trapezoidal waveform electric current to the windings 8 is controlled by the controller 7 in response to the angular position of the rotor assembly 4 (which is sensed by a position sensor schematically indicated as reference number 50), and in response to the performance required from the motor. Position control of the switching of the current to the armature can control the effective magnetic flux per pole, and hence the back emf, over a wide range. The controller 7 advances and retards the switching position in order to obtain field weakening and field strengthening effects as required.

The operation of the motor 1 will be described with reference to the simplified four pole arrangement of FIGS. 10 to 13.

Figure 10:
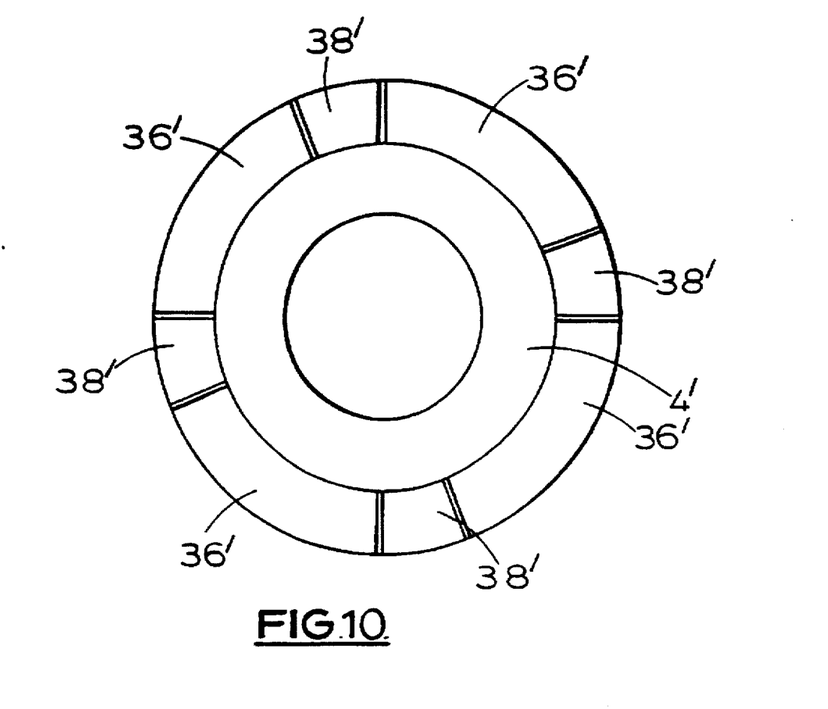
FIG. 10 shows schematically a cross-section through a transducer rotor assembly.
Figure 11:
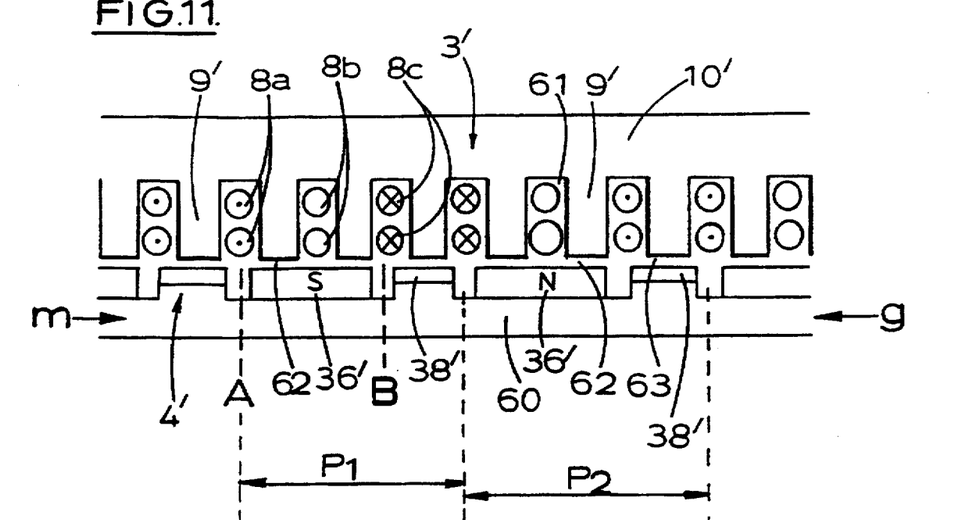
FIG. 11 shows schematically a linear transducer in order to assist in illustrating the operation of the motor of FIG. 1.

Permanent magnets 36' are separated by laminar interpoles 38'. FIG. 11 shows the arrangement in linear fashion for simplicity and further illustrates a return path member 60 for the rotor 4'. The stator 3' consists of polyphase windings 8a, 8b, 8c placed within slots 61 formed between soft magnetic material or composite teeth 9' which in turn abut or are formed as part of a flux return member 10'. Air gaps 62 and 63 are formed between the magnets 36' and the teeth 9' and between the interpoles 38' and the teeth 9'. It is advantageous in some instances to make air gap 63 between the interpoles and the teeth smaller than the air gap 62 between the magnets and the teeth. This can help to provide a better balance of the flux between the P.M. and the steel poles. The directions of rotation of the rotor when the transducer is used as a motor and when used as a generator are illustrated by arrows m and g. The pitch between adjacent South and North poles when the motor is switching at point A is represented by dimensions P1 and P2.

Figure 12A:
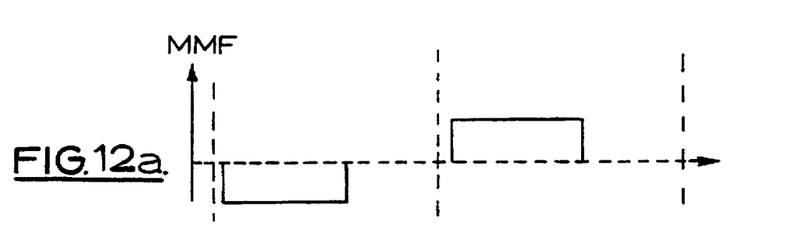
FIGS. 12a to 12c show schematically the magnetomotive force waveforms of elements of the transducer of FIG. 11.
Figure 12B:
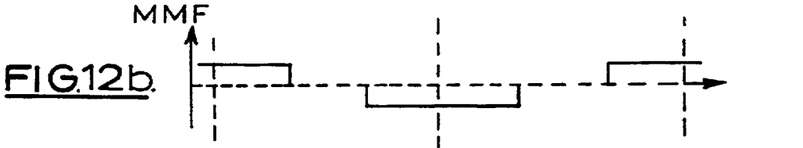
Figures 12C, 13:
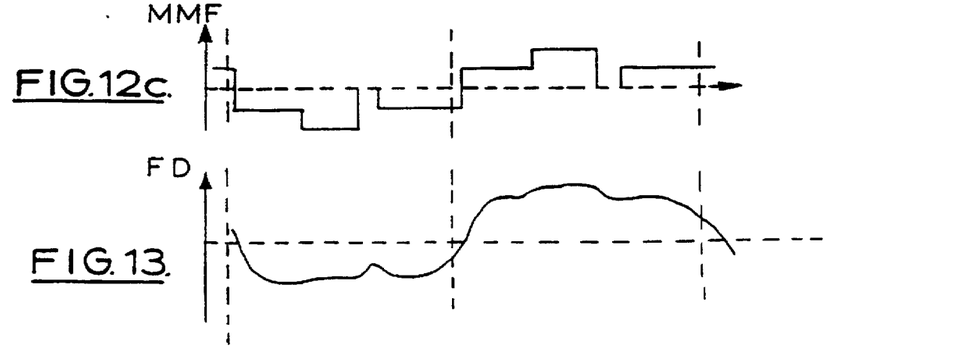
FIG. 13 shows schematically how the flux density varies across the air gap of the transducer of FIG. 11.

FIG. 12a shows diagrammatically the linear, and hence phase, relationships of the Magneto-Motive Force (MMF) produced by the permanent magnetic fields in the linear transducer (motor) shown in FIG. 11. FIG. 12b shows the MMF produced by the windings of the stator of the motor of FIG. 11. The combined MMF's form a composite waveform which is shown in FIG. 12c to produce an increased average magnetic flux emanating from each magnetic pole. FIG. 13 shows a typical air gap flux density waveform.

The stator's MMF is shown at the top and the rotor's below. The toothed stator is shown with a three phase winding employing one slot per phase. Each pole of the rotor comprises a permanent magnet spanning approximately fifty five percent of the pole pitch and the inter-pole spanning approximately thirty percent of the pole pitch. The permanent magnets are located symmetrically between the interpoles. The width of the resultant gaps is chosen to provide an adequate flux break between the magnets and the interpoles such that it minimises flux leakage and prevents excessive cogging torque.

It will be appreciated that, owing to the symmetrical arrangement of the poles, both directions of rotation are achievable, this being dependent upon the choice of position A or B as the reference for the switching of the armature current.

If the transducer is operated as a motor, position A is used as the reference switching position for clockwise rotation, and if the transducer is operated as a generator, position B is used as the reference switching position for clockwise rotation.

The transducer is therefore capable of four quadrant operation.

Although FIG. 11 is shown in the simplest three phase arrangement, it is preferred to choose a greater number of slots per pole per phase in order to reduce the cogging torque to a minimum.

FIG. 12c shows the MMF waveforms when phase one has zero current and phases two and three are at peak current. The combination of the MMF waveforms partially depends upon the phase relationship of the stator currents with the rotor position, so that a lagging current will result in the stator winding MMF shifting to the right whilst a leading current will result in a shift to the left.

By switching the armature currents in relation to the rotor position the stator MMF waveform can be shifted to either weaken or boost the permanent magnet field. With a pure permanent magnet transducer this would have little effect on the flux, but by including the inter-poles flux variations of greater than sixty percent are possible.

The maximum variation in flux will occur with the stator current at its maximum. Lower currents give proportionally reduced range of control. However, when no current is applied to affect the permanent magnet field the proposed transducer will have less flux than a conventional transducer and will thus reduce the back emf.

Power semiconductors can be arranged in the normal three phase full-wave bridge circuit, but means of reversing the current flow is necessary to obtain four quadrant operation. Current control (chopping the current to limit its value) can be used to determine the power output from the transducer.

Position control (i.e. control of the point at which switching of each phase occurs) is an essential requirement of the proposed transducer operation. Power output can be determined at any rotor speed by incorporating an appropriate algorithm or look-up table in the control software of the controller 7.

An advantage of the proposed transducer is that it reduces the amount of permanent magnet material required. For a given maximum power output, the magnet pole arc can be reduced when compared to a conventional machine due to the field strengthening effect of the winding current. Since the thickness of pole required to prevent demagnetisation under limiting temperature and current conditions is related to the pole arc, the thickness of the pole may also be reduced by a similar amount. The overall reduction in permanent magnet material may greater than thirty percent when compared to a conventional transducer construction. This makes the transducer far cheaper to manufacture.

The speed range of permanent magnet transducers is usually limited by the voltage available from the supply. Although series-parallel switching can extend the speed range, the cost and complexity of controls is unavoidably increased. The inclusion of interpoles will enable the operating flux density for part of the pole arc to be increased by about fifty percent over that available from neodymium boron iron permanent magnets. The overall increase in flux per pole is estimated to be about twenty percent. Compared with a conventional transducer, the stall torque would therefore be increased by twenty percent.

Thus the motor of FIGS. 1 to 4 when operated as exemplified by FIGS. 10 to 12 needs power semiconductors of a lower voltage and/or lower current rating than conventional D.C. brushless motors, has less permanent magnet material, has an increased speed range, an increased starting torque, and less easily demagnetised permanent magnets.

Modifications of some of the components of the motor 1 are shown in FIGS. 2b–d, 5, 6, 8, 9, and 14.

FIG. 2b shows a section through a motor similar to that of FIG. 1 (and the same reference numerals have been given) except that the interpoles 38 and the body 37 of the rotor of the motor are made from laminations which are in planes normal to the axis of rotation. The body 37 and interpoles 38 are made from the same laminated sheet material. The structure of the rotor is similar to that shown in FIG. 5.

Figure 2C:
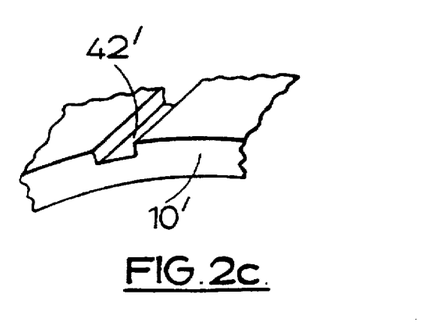
FIGS. 2c and 2d show details of modified stator disc assemblies.

FIG. 2c shows the provision of communication channels, referenced 42', in the back member 10', either instead of or in addition to the channels 42 of the arrangement of FIGS. 1 and 2. If communication channels are provided in both the back member and the outer wall 41 those of the wall may be superimposed with those of the back member so as to give channels of greater cross sectional area, or they could be offset.

Figure 2D:
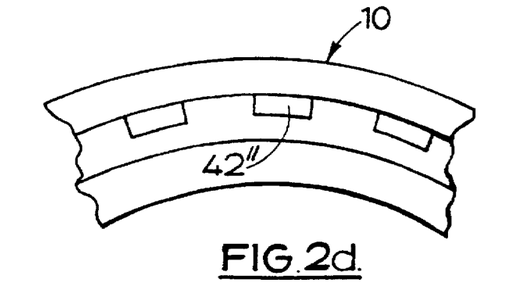
Figure 9:
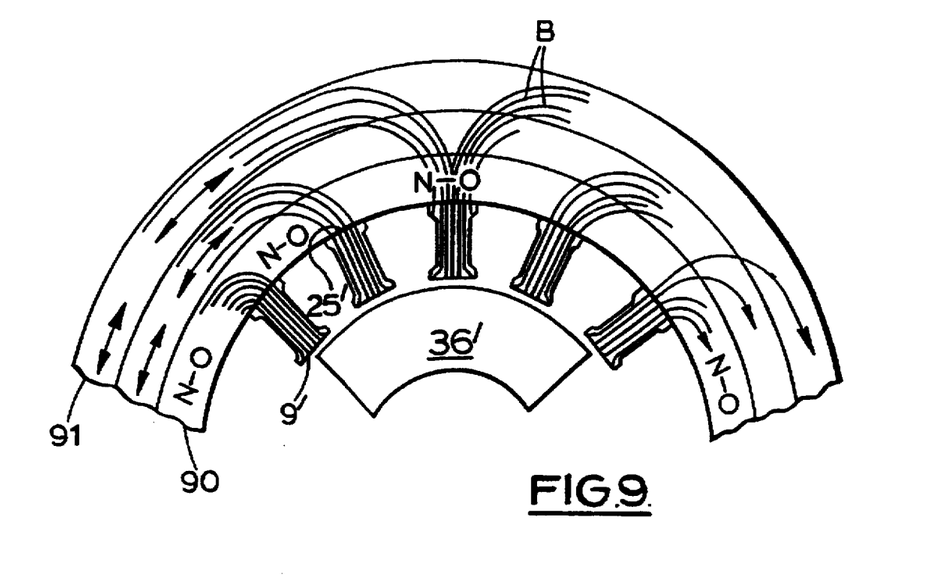
FIG. 9 schematically shows a composite back plate and teeth.

FIG. 2d shows the provision of communication channels 42" in an intermediate layer of the backing member (see FIG. 9). The channels 42" could extend completely through the radial depth of the layer in which they are provided.

Figure 5:
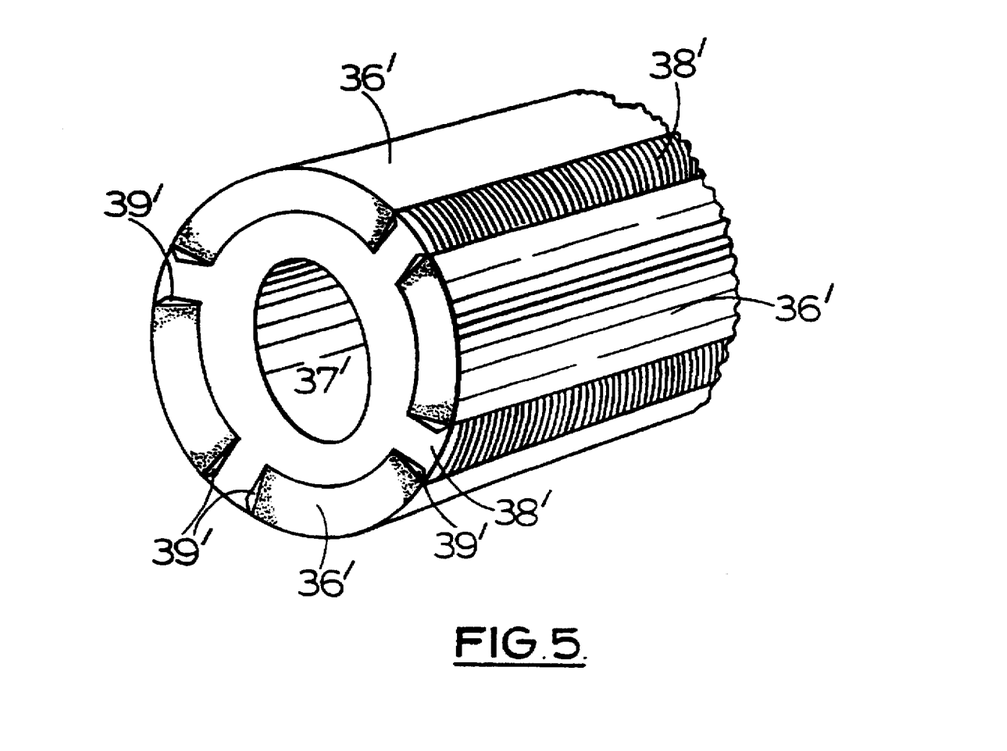
FIG. 5 shows another rotor.

FIG. 5 illustrates an alternative way of recessing the magnets 36' in the rotor assembly to that shown in FIG. 2a. The carrying body 37' is made from laminated steel, with the laminations being in diametral planes. The interpoles 38' so produced are not as efficient as those of FIG. 4 at reducing magnet to magnet flux since they have less resistance to circumferential flow of magnetic flux. Air gaps 39' are provided between the interpoles 38' and the magnets 36'. These introduce a high reluctance into the path between magnetic poles and cause the magnetic flux to be directed more radially to the teeth of the stator where it can serve a useful purpose, avoiding magnetic short circuits.

The arrangements of FIG. 5 could be modified by the provision of interpoles as separate elements carried by a cylindrical body 37'.

The teeth 9 of the motor could be as shown in FIG. 6a, being basically rectangular in cross section and having no head or foot portion; or as shown in FIG. 6b having head and foot portions 15; or as shown in FIG. 6d in which the laminations 20 are in planes normal to the axis of rotation; or as shown in FIG. 6c, having self-centering spring formations 70. Such a tooth need not be very accurately positioned during manufacture since its formations 70 will tend to centre it in whatever space it occupies.

The teeth may be formed by an automated process in which a continuous strip of metal is repeatedly folded upon itself so as to have generally parallel central regions 71 and fold regions 72 at the ends of the central regions 71. The fold regions 72 are then ground off or otherwise removed to leave just the desired central regions. Lines 73 of FIG. 6c indicate grinding planes. This method of making a tooth may comprise yet another invention, and is of course applicable to the manufacture of interpoles as well as teeth.

Figure 8A:
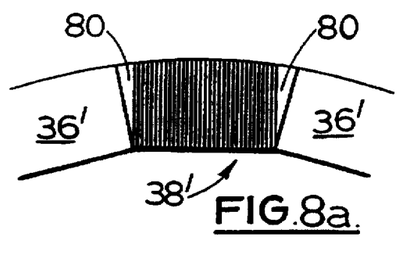
FIGS. 8a to 8e show five alternative interpolar regions for the rotor of FIG. 4.
Figure 8B:
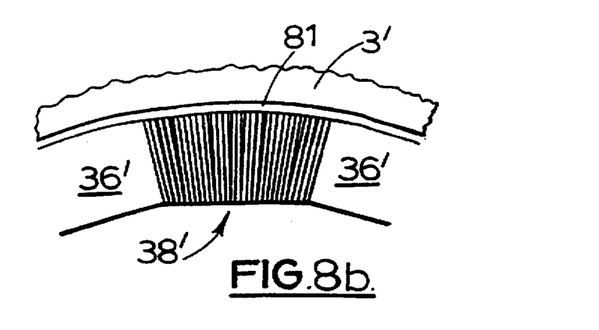
Figure 8C:
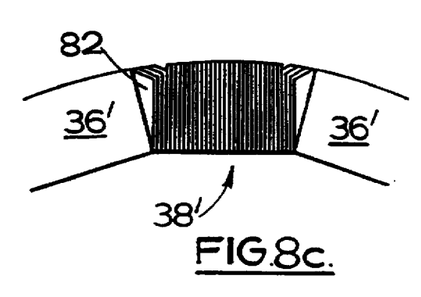
Figure 8D:
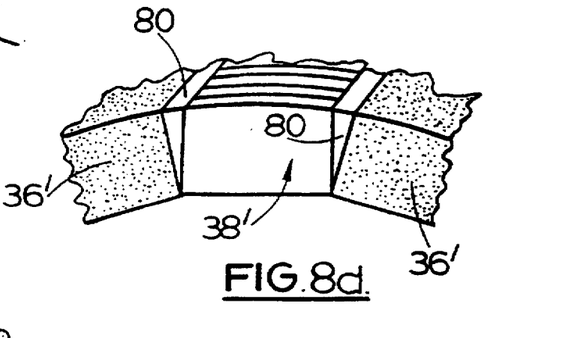
Figure 8E:
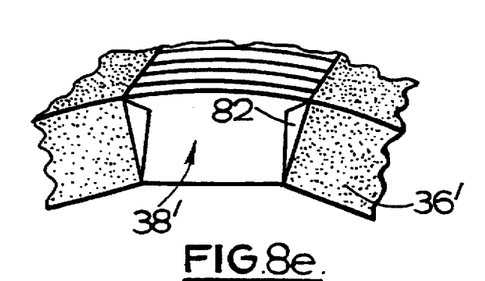

FIGS. 8a to 8e illustrate a number of different interpoles 38'. The interpole of FIG. 8a comprises a rectangular block of laminations and introduces an air gap 80 between the outer laminations and the magnets 38'. FIG. 8b has evenly distributed laminations arranged as a fan. This presents a uniform flux capability to the air gap 81 between the rotor assembly and the stator assembly. FIG. 8c shows an interpole having bent laminations at its circumferentially spaced sides which provide a partial air gap 82 whilst still presenting a more uniform flux to the air gap between the rotor and stator assemblies. The interpoles of FIGS. 8d and 8e are similar to those of FIGS. 8a and 8c, having air gaps 80 and 82, but their laminations lie in planes normal to the axis of rotation of the rotor.

I have been surprised to find that the interpole arrangements discussed produce a significant reduction in cogging torque. I believe that this is due to magnetic flux at the outer radial, and outer circumferential, edge of a magnetic pole being "short-circuited" through the first lamination of the adjacent interpole and thereby not being available to produce cogging torque. Thus a method of reducing cogging torque could be to provide appropriate interpoles. This reduced cogging torque effect may not require more than a single lamination of an interpole with an appropriate magnetic barrier between them (for example a layer of resin).

FIG. 9 schematically illustrates a composite back member 10' for the stator assembly. Teeth 9' are provided adjacent, but just spaced from, an inner layer 90 so as to provide the air gap 25'. One or more outer layers 91 are also provided. The inner layer 90 is made of amorphous, or non-orientated, steel which has a high flux capacity in any direction, whilst the outer layer or layers 91 is made of unidirectional steel with its low loss direction bent around so as to extend generally tangentially. Thus where the flux from the teeth turns to flow circumferentially to another tooth it does so predominantly in the amorphous steel, yet where it extends generally in a "straight" line or circumferential arc it does so largely in unidirectional steel along the low loss direction. The arrangement of FIG. 9 could be modified by providing axial fluid communication channels in one or more of the outer layers 91, as suggested by FIG. 2d.

Figure 14:
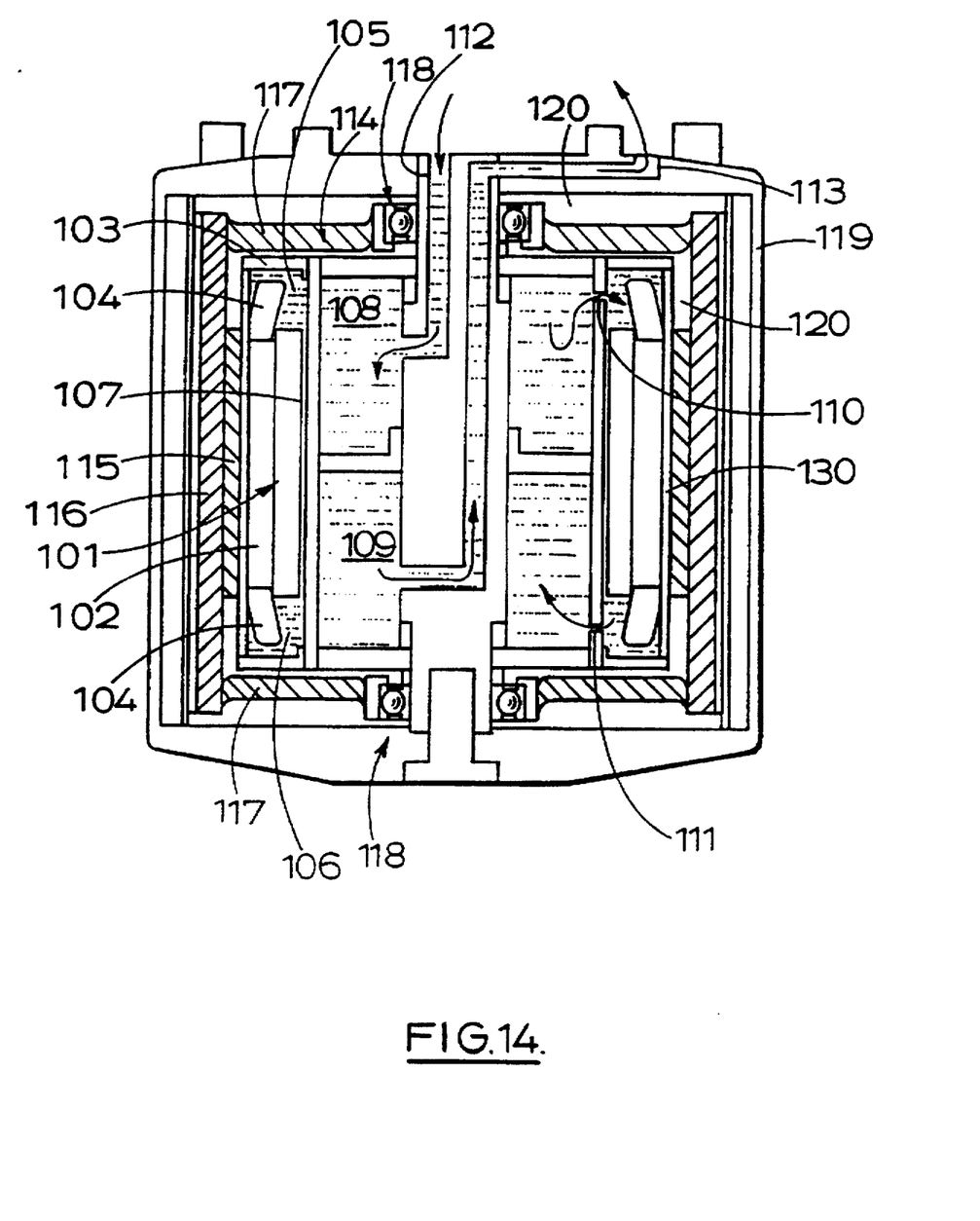
FIG. 14 shows yet another transducer.

I also envisage an inverted arrangement of the motor of FIG. 1 where the stator is on the inside and the rotor on the outside. This is shown in FIG. 14. FIG. 14 also shows the arrangement of isolating the cooling liquid from the rotor using an integral sleeve member 130 extending for the axial length of the machine, rather than two separate sealing collars 11 and 12 (this possibility is discussed in relation to an "inner rotor" machine at page 13, third paragraph).

In the inverted arrangement shown in FIG. 14 a solid armature 101 comprising windings 102 embedded in resin is affixed to cylindrical end pieces 103 to form a stator assembly. End turns 104 of the windings 102 occupy enclosed annular end turn chambers 105 and 106 which are connected by passageways 107. Inlet and outlet circulation chambers 108 and 109 are defined in the central region of the stator and communicate with the annular end turn chambers 105 and 106 via ports 110 and 111 respectively. An inlet 112 supplies coolant to the chamber 108 and coolant leaves chamber 109 via an outlet 113.

A rotor 114 comprises magnets 115 affixed to a return path member 116 which is journalled for rotation on the stator assembly via diaphragm plates 117 which are connected to bearings 118.

An outer containment housing 119 surrounds the rotor 114 and defines a sealed rotor chamber 120 in which the rotor 114 rotates. The housing 119 is connected to the stator assembly in a sealed manner such that the rotor chamber 120 can be permanently evacuated during manufacture of the machine.

The rotor 114 has a significant mass and can be used as a flywheel to store energy when the transducer is in operation (for example in a vehicle). A suitable electronic controller may even allow us to reclaim some of the energy stored in the rotor, by example by using the motor as a generator. Alternatively or additionally it could be reclaimed mechanically, possibly using a kind of clutch arrangement.

The motor of FIG. 1 has been designed for use in a vehicle, such as an automobile. I propose to provide a motor at one or more, preferably all, of the road-engaging wheels of the vehicle. The motor of FIG. 1 gives us a form of continuously variable transmission for the vehicle. The vehicle is preferably an internal combustion engine—electric drive hybrid in which an I.C. engine powers a battery which in turn powers the motor.

I have found that when a motor similar to that of FIG. 1 is to be used in circumstances where superconductor windings, or strips taking the place of windings, are employed it can be desirable to have the winding in intimate contact with a cooling conduit. For example the winding wire could be provided inside a cooling conduit. The cooling conduit, incorporating a winding wire or strip, could be formed onto the stator as a winding, or in a similar manner to that of a winding.

Figures 15, 16:
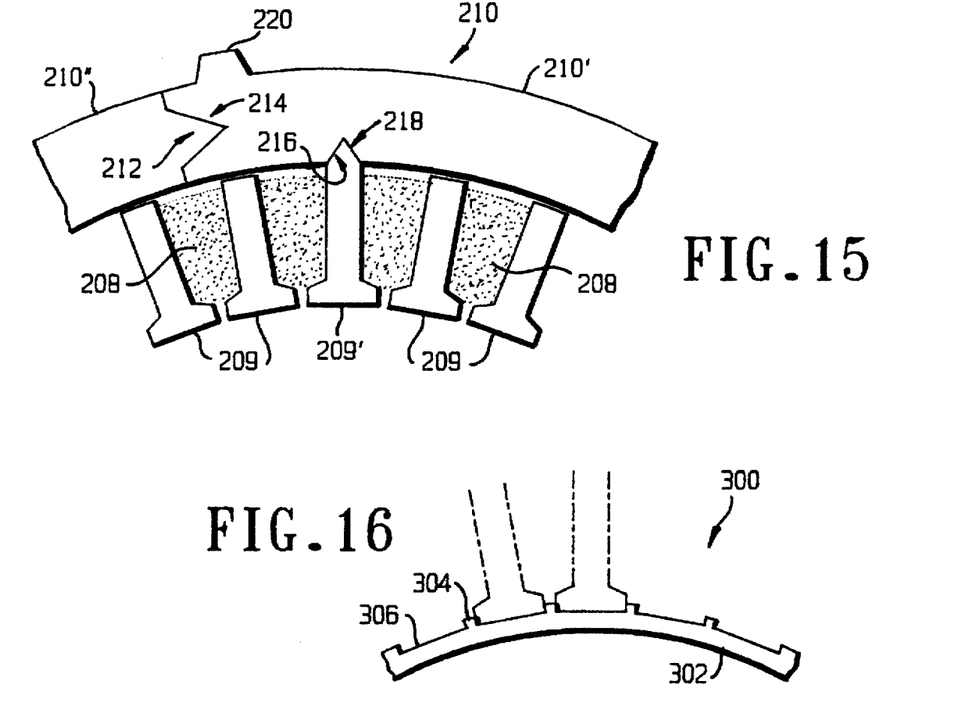
FIG. 15 shows an armature comprising a back member of an alternative construction and teeth.
FIG. 16 is a partial transverse section of a sealing collar for a further alternative embodiment of the invention.

A portion of an armature incorporating an alternative back, or return path member 210 is illustrated in FIG. 15, together with a plurality of teeth 209, 209'. The machine of which the armature forms a part may, for example, be a transducer similar to that described with reference to FIG. 1.

The back member 210 is an assembly of a plurality of arcuate, segmental components 210', 210" of unidirectional steel, the low-loss direction being transverse to the axis of curvature of the segment, around the back member 210. Alternatively the back member segments may be isotropic.

End faces of adjacent segments 210', 210" are in close contact with one another in the assembled back member 210. Contacting end faces are provided with interengaging formations, in this embodiment, a complementary projection 212 and groove 214, to locate adjacent segments 210', 210" with respect to one another. As described with reference to FIGS. 1 and 2, the armature further comprises teeth 209, 209' extending radially inwardly of and attached to the back member 210. Windings 208 are disposed between adjacent teeth 209, 209'. Most of the teeth 209 have radially outer end surfaces of arcuate form to correspond to the inner surface of the segments 210', 210" to which they are secured. In this embodiment, a small number of teeth 209' (perhaps, only two to four in a transducer) have an end formation which engages with a complementary formation of the segment 210' to which it is attached. Typically, such teeth 209' have a pointed end 216 which is located within a longitudinal groove 218 in the inner surface of the segment 210', although it will be understood that many shapes of complementary formations will be suitable.

The provision of the small number of teeth 209' described in the last-preceding paragraph has the advantages of (a) providing a mechanical connection between the teeth 209, 209' and the associated windings 208, and the back member 210 through which torque generated by the windings 208 may be transmitted; and (b) providing a reference datum by means of which angular alignment between the teeth 209, 209' and windings 208, and the back member 210 may be achieved. Angular alignment of the teeth relative to, for example, position sensors may be important in the electronic control of the motor.

Figure 17:
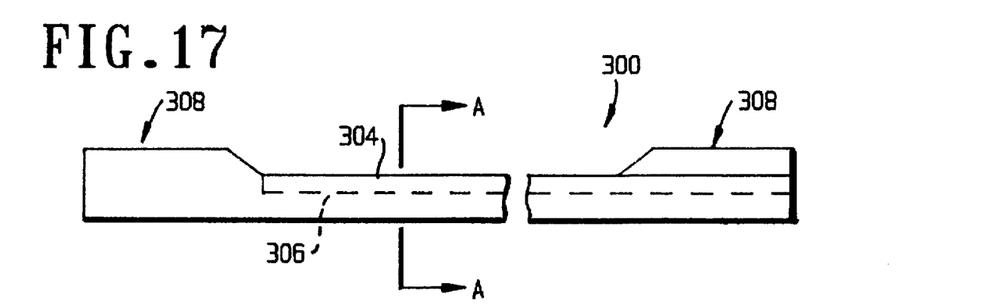
FIG. 17 and 18 are, respectively, longitudinal sections of first and second alternative forms of the sealing collar of FIG. 16.
Figure 18:
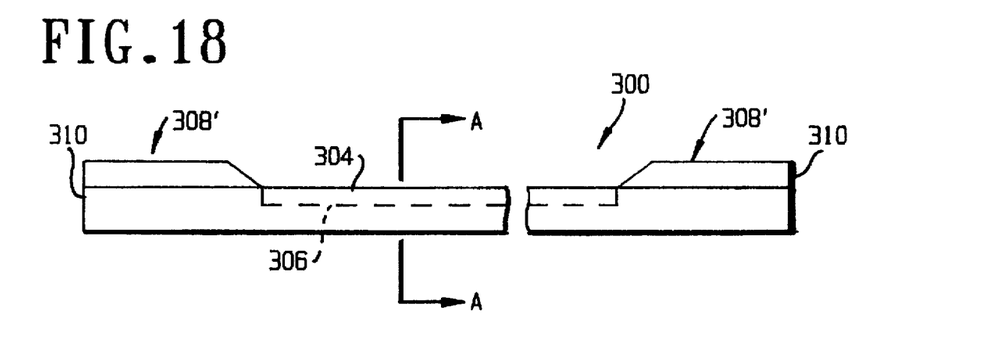

An armature may be formed incorporating a sealing collar 300, as illustrated in FIGS. 16 to 18, which performs the function of the collars 11, 12 described with reference to FIG. 1, and, further, simplifies assembly of the armature.

The sealing collar 300 is a generally cylindrical construction having a thin central portion and thickened outer end portions 308, 308'. The collar 300 provides a continuous impermeable membrane through the machine. The thin central portion has radially-outwardly projecting, axial ridges 304, between which are defined axial grooves 306, there being the same number of grooves 306 as armature teeth 209, 209'. The thickened end portions 308, 308' serve to provide structural reinforcement for the collar 300 and also provide a sealing body, as will be described. Alternative arrangements of the end portions 308, 308' are shown in FIGS. 17 and 18. In FIG. 17, one end portion 308 is integrally formed with the collar to provide reinforcement while in FIG. 18, a stiffening ring 310 is applied to the collar 300 at its end portions 308'. The stiffening ring may be forced into the winding/tooth assembly after the windings and/or teeth have been attached.

Construction of an armature incorporating the collar 300 may be carried out as follows. The collar 300 is formed first, as described above. Then, the teeth 9, 209, 209' are secured to the collar 300, inner end surfaces of each tooth being attached to the collar 300 within a respective groove 306. The grooves locate the teeth relative to each other in the correct positions. This forms an assembly of the collar 300 and teeth 9, 209, 209' substantially in their mutual arrangement in which they will be incorporated into the armature. Onto this assembly, the armature windings 8, 208 are wound and subsequently the back member 10, 210 is applied (the last step being most easily carried out in the case of the segmental back member as described with reference to FIG. 15). The thickened end potions 308, 308' of the collar then perform the function of the sealing collars 11, 12 described with reference to FIG. 1.

With reference to FIG. 15, an armature back member 210 may be provided with a longitudinal outwardly-projecting rib 220. [The rib may equally be applied to a one-piece back member 10, described with reference to FIG. 1.] The housing of a transducer (not shown in FIG. 15 but shown as 41 in FIG. 1) has, in such embodiments, a corresponding longitudinal groove into which the rib 220 is received in order to provide an alignment datum between the armature and the housing and to transmit torque therebetween.

The principle of contructing a stator of a motor (transducer) from the inside outwards, assembling the back member from the inside around the windings, may itself be inventive, whether or not the back member is made of segments.

I claim:

1. An electromechanical transducer for an electrically powered automobile, said transducer comprising:

a housing;

a stator, disposed within said housing, comprising a winding, said winding having a first region embedded in thermal insulating resin, and a second region not embedded in said resin;

a rotor, disposed within said housing, comprising (i) a main shaft, and (ii) at least one permanent magnet disposed in operative association with said stator;

means, operatively disposed within said stator, for fluidly isolating said second region of said winding from a remaining portion of said transducers; and means, in fluid communication with said second region of said winding, for circulating coolant over said second region of said winding, to thereby dissipate heat from said transducer; wherein:

said second region comprises a plurality of end turns of said winding;

said first region comprises a central portion of said winding that is between said plurality of end turns; and said coolant is in direct cooling contact with said second region, but not with said first region.

2. An electromechanical transducer comprising:

a rotor member;

a stator member;

an electrical winding on a first one of (i) the rotor member and (ii) the stator member;

isolating means for isolating at least a part of said first one of (i) the rotor member and (ii) the stator member from a second one of (i) the rotor member and (ii) the stator member; and cooling fluid in direct contact with said part, said isolating means isolating said part from the second one of (i) the rotor member and (ii) the stator member;

a plurality of end turns of said electrical winding being disposed on said part; and said cooling fluid being in direct contact with said plurality of end turns, but not with a central portion of the electrical winding between the plurality of end turns.

3. A transducer according to claim 2, further comprising a cooling circuit fluidly associated with said first member, means for forcing said fluid around said circuit.

4. A transducer according to claim 2 in which the rotor member is isolated from the cooling fluid.

5. A transducer according to claim 2 in which the central portion and the plurality of end turns are held in a thermally substantially uninsulated manner.

6. A transducer according to claim 2, in which the electronic winding comprises a plurality of windings interleaved with a plurality of magnetic field concentrating means.

7. A transducer according to claim 6 in which the transducer has a central axis and a pair of axially spaced end chambers into which the plurality of end turns project.

8. A transducer according to claim 7 in which passage means communicates one end chamber with the other so as to allow said cooling fluid to flow between them.

9. A transducer according to claim 8 in which the passage means are provided in an outer housing.

10. A transducer according to claim 8 in which the passage means are provided in a back, or return, path member disposed adjacent the windings.

11. A transducer according to claim 2 in which a fluid passageway means is disposed adjacent to the windings so as to cool a substantial length of winding.

12. A transducer according to claim 11 in which said winding is effectively provided in an associated cooling fluid passageway, or at least forms part of the surfaces defining the fluid passageway.

13. A transducer according to claim 2 in which a cooling fluid passageway conduit is wound onto the stator and follows at least part, or substantially all, of the winding.

14. A transducer according to claim 2 in which said part is isolated from the second member by a dividing wall.

15. A transducer according to claim 2 in which the second member is housed in a chamber which has an atmosphere other than that of normal atmosphere air.

16. A transducer according to claim 15, in which the chamber is at least partially evacuated so as to have a low pressure.

17. A transducer according to claim 15 in which the chamber contains an inert, corrosion reducing gas.

18. A transducer according to claim 2, wherein said transducer is a motor or a generator.

19. A transducer according to claim 18, further comprising a cooling circuit, fluidly associated with said member, and pump means for pumping said fluid around said circuit.

20. An electromechanical transducer for an electrically powered automobile, said transducer comprising:

a housing;

a stator, disposed within said housing, comprising a winding, said winding having a first central region which is embedded in thermal insulating resin, and a second region comprising a plurality of end turns of said windings which are not embedded in said resin;

a rotor, disposed within said housing, comprising (i) a main shaft, and (ii) at least one permanent magnet disposed in operative association with said stator;

sealing means, operatively disposed within said stator, said sealing means and said resin acting to define a chamber for fluidly isolating said second region of said winding from a remaining portion of said transducer; and means, in fluid communication with said second region of said winding, for circulating coolant over and in direct cooling contact with said second region of said winding, to thereby dissipate heat from said transducer.

* * * * *